United States Patent [19]

Wells et al.

[11] 4,051,196
[45] Sept. 27, 1977

[54] ANTISTATIC FIBER CONTAINING CHAIN-EXTENDED TETROLS BASED ON DIAMINES

[75] Inventors: Rodney Lee Wells; Lamberto Crescentini, both of Chester, Va.

[73] Assignee: Allied Chemical Corporation, Morris Township, N.J.

[21] Appl. No.: 711,764

[22] Filed: Aug. 4, 1976

Related U.S. Application Data

[63] Continuation of Ser. No. 581,194, May 27, 1975, abandoned.

[51] Int. Cl.$^2$ .............................................. C08L 77/00
[52] U.S. Cl. .................... 260/857 PG; 260/45.9 NC; 260/77.5 AM; 260/77.5 AQ; 260/75 N; 260/78 S; 260/830 P; 260/857 PE; 260/858
[58] Field of Search ................................. 260/857 PE

[56] References Cited

U.S. PATENT DOCUMENTS

| | | | |
|---|---|---|---|
| 3,584,047 | 6/1971 | Dexter | 260/45.8 N |
| 3,655,821 | 4/1972 | Lofquist | 260/857 PG |
| 3,787,523 | 1/1974 | Crescentini | 260/78 S |
| 3,848,023 | 11/1974 | Baggett | 260/78 S |
| 3,882,190 | 5/1975 | Wells | 260/78 S |

*Primary Examiner*—Paul Lieberman
*Attorney, Agent, or Firm*—Fred L. Kelly

[57] ABSTRACT

It has been suggested that antistatic properties of fibers of polyamide could be improved by uniformly dispersing in the polyamide between about 1 percent and about 12 percent by weight of a predominantly branched, chain-extended propylene oxide-ethylene oxide copolymer based on a diamine. However, with incorporation of this antistatic additive in the polyamide, serious problems have been encountered in melt-spinning due to the frequent occurrence of "nubs" or enlarged places in the extruded polyamide filament. It has now been found that the occurrence of said nubs in the antistatic polyamide fiber can be greatly reduced by dispersing in the polymer about 0.5 to 12% by weight, based on the weight of the antistatic agent, of a phenol compound represented by the formula:

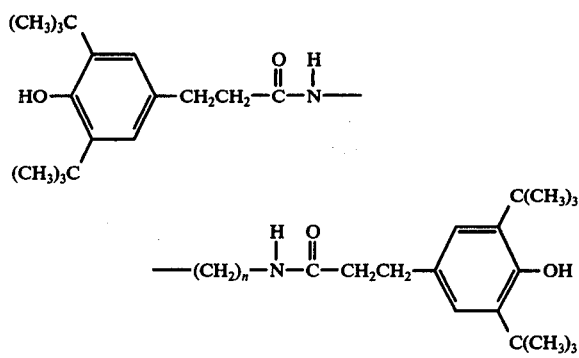

where $n$ is 2 to 6.

In comparative tests with antistatic yarns containing various commercially available hindered phenol compounds, the yarns of the present invention showed significantly greater breaking strength retention after exposure to light in standard tests.

5 Claims, No Drawings

ANTISTATIC FIBER CONTAINING CHAIN-EXTENDED TETROLS BASED ON DIAMINES

This is a continuation of application Ser. No. 581,194 filed May 27, 1975 now abandoned.

CROSS-REFERENCES TO RELATED APPLICATIONS

This application is directed to an improvement upon the invention disclosed in U.S. application Ser. No. 294,971, filed Oct. 11, 1972.

BACKGROUND OF THE INVENTION

This invention relates to a process for the melt-spinning of a filamentary structure from a synthetic polyamide polymer. More particularly, it is concerned with an improved process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. More specifically, it is disclosed in U.S. Pat. No. 3,475,898 to Magat and Sharkey to use poly(ethylene-propylene)ether glycols for this purpose. More recently, U.S. Pat. No. 3,657,386 discloses that certain propylene oxide-ethylene oxide copolymers based on ethylene diamine are useful in preparation of an antistatic fiber of polyamide. It has also been suggested that the utility of synthetic fiber of polyamide could be increased by dispersing in the polyamide an antistatic compound which is a reaction product of:

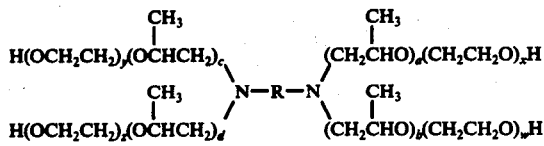

where $a$, $b$, $c$, $d$, $w$, $x$, $y$ and $z$ are each a whole number and R is a difunctional radical from a hydrocarbon containing 1 to 13 carbon atoms, said tetrol compound having a molecular weight between about 4,000 and about 50,000 and at least one compound selected from the group consisting of diepoxides and compound which yield the following divalent radicals:

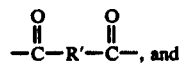

where R' is a difunctional radical from a hydrocarbon containing 1 to 30 carbon atoms. However, serious problems were encountered in melt-spinning due to the frequent occurrence of "nubs" in the fiber. The term "nubs" is conventionally applied and is used herein to mean enlarged sections of filament no more than several filament diameters in length. Nubs may be formed by a foreign, non-orientable substance which interferes with normal fiber stretch in a short section, resulting in an enlargement. Foreign substances which are believed to have contributed to nubs in the present instance include carbonized polymer from face of extruder die and spinnerette, and gels formed in the polymer. Gels appear to be the chief cause, i.e., the nubs are probably created by non-orientable gel from cross-linked polymer. Thermal degradation of the polymer may be an important causative factor.

The reactions in thermal degradation of polyamides containing polyalkylene ether additives are not entirely understood. It is likely that thermal degradation produces a decomposition product which serves to form cross-links between amide groups and adjacent polymer chains. The decomposition reaction proceeds slowly, finally building up a three-dimensional network of molecules which may be called polymer gel and which eventually reaches the stage where it forms an infusible coating on the walls of the reactor and other equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the three-dimensional structural stage, but which has not yet reached the stage of being infusible. This kind of polymer gel is readily carried with the stream of flowing polymer. Being still molten or at least softened, it passes through the pump and even through the filter medium to show up either as discontinuities or as viscosity differences in the spun filament. When these filaments are later cold drawn, these defects may cause breaks in the filaments which either cause the whole thread to break or else form nubs which go through to be counted as quality defects in the final yarns.

More recently, it has been discovered that certain hindered phenol compounds may be incorporated into the antistatic polyamide to reduce the formation of nubs in the fibers. For example, U.S. Pat. No. 3,876,725, issued Apr. 8, 1975, to Rodney Lee Wells et al., discloses that the occurrence of said nubs in the antistatic polyamide fiber can be greatly reduced by dispersing in the polymer about 0.5 to 12 percent by weight, based on the weight of the antistatic agent, of a phenol compound represented by the formula:

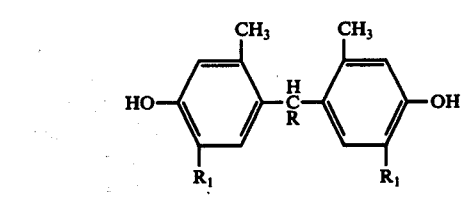

where R is an alkyl hydrocarbon group containing less than nine carbon atoms and $R_1$ is a tertiary alkyl group containing at least four but not more than 12 carbon atoms. In comparative tests with antistatic yarns containing various commercially available hindered phenol compounds, the yarns of the patent showed significantly greater breaking strength retention after exposure to light in standard tests.

Although the antistatic polyamide fiber of U.S. Pat. No. 3,876,725 is an important contribution to this art, research in this field has been continued in an effort to produce an antistatic polyamide fiber having still greater breaking strength retention than the fiber of said patent. Moreover, the research was widened to amides containing hindered phenol groups in an effort to lower the volatility of the phenol compound to prevent vaporization losses during melt spinning of the polymer.

SUMMARY OF THE INVENTION

It is an object of this invention to avoid the above difficulties by minimizing gel formations in the molten polyamide. Another object is to avoid accumulation of polymer gel on the walls of the reactor, in the pump, or in the filtering medium when melt-spinning the polyamide. A further object is to improve the uniformity and quality of filaments or fibers formed from the molten polymer, in particular to minimize nub formation in the filaments and improve breaking strength retention after exposure to light. Other objects will become apparent from the disclosure and the appended claims.

These objects are accomplished by the present invention which provides an improvement in the process for the formation of an antistatic polyamide fiber from a fiber-forming polyamide polymer containing about 1 percent to 12 percent by weight of an antistatic compound which is a reaction product of a tetrol compound represented by the formula:

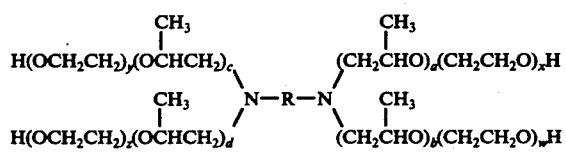

where $a$, $b$, $c$, $d$, $w$, $x$, $y$ and $z$ are each a whole number and R is a difunctional radical from a hydrocarbon containing 1 to 13 carbon atoms, said tetrol compound having a molecular weight between about 4,000 and about 50,000, and at least one compound selected from the group consisting of diepoxides and compounds which yield the following divalent radicals:

where R' is a difunctional radical from a hydrocarbon containing 1 to 30 carbon atoms, by extruding the molten polymer through an orifice into a quenching medium and thereafter stretching the resulting filaments, the improvement comprising dissolving in the polymer prior to extrusion about 0.5 to 12 percent by weight, preferably 1 to 6 percent, based on the weight of the antistatic compound, of a phenol compound of the formula:

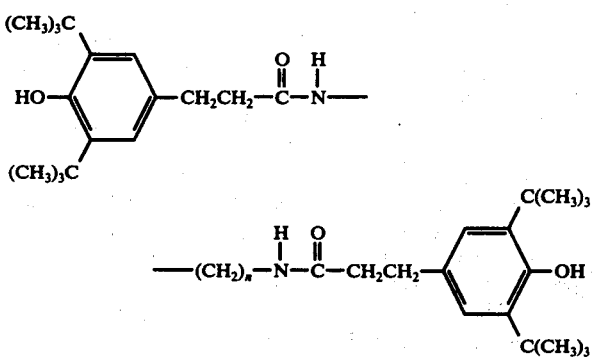

where $n$ is 2 to 6. Such compounds may be economically prepared and give excellent results in the present invention.

As stated above, the present invention is an improvement upon the invention disclosed in U.S. application Ser. No. 294,971 which relates to an improved antistatic fiber containing a novel antistatic compound. The novel antistatic compound is prepared by reacting a tetrol compound, as described above, with a chain-extender compound, for example a diepoxide, a dicarboxylic acid or a diisocyanate, to form predominantly branched, chain-extended polymer having a melt viscosity of about 800 to 50,000 centipoises, preferably 1,500 to 25,000 centipoises, at 100° C. Preferably, the ethylene oxide moiety makes up 10 to 90% of the molecular weight of the antistatic compound. The mol ratio of chain-extender compound to tetrol compound is preferably between about 0.7 and 1.0.

The phenol compounds useful in the present invention are known compounds and some are commercially available. The phenol compounds of the invention may be prepared in accordance with U.S. Pat. No. 3,584,047.

The tetrol compound which is chain-extended for use as an antistatic additive in this invention is fully described in U.S. Pat. No. 2,979,528 to Lundsted, assignor to Wyandotte. Suitable tetrol compounds include those commercially available as "Tetronic" series block copolymers. The "Tetronic" copolymers are polyoxy(ethylene/propylene) adducts of ethylenediamine, i.e., R in the formula given above = $—CH_2CH_2—$ and they have molecular weights usually between 1,650 and 26,000. "Tetronic" copolymers having various lengths of poly(oxyethylene) poly(oxypropylene) chains are available. A 3 and 4 digit code number of the "Tetronic" copolymer indicates its molecular composition. When four digits are employed, the first two indicate the average molecular weight of the hydrophobe (poly(oxypropylene) branches on the alkylene-diamine). When three digits are used only the first number serves this purpose. The molecular weight of the poly(oxypropylene) branches lies within the range $[500(x-2)] + 1$ to 500 $(x-1)$ where $x$ is at least 3 and is the number represented by the first two digits of the four digit code or the first digit of the three digit code. The last digit of each code number represents the weight percentage of hydrophilic (poly(oxyethylene)) units divided by 10, thus indicating such percentage to the nearest 10%. The tetrol compounds in the examples are described this way.

The diamines of which the tetrols are adducts are preferably alkylene diamines and preferably the alkylene group, i.e., the R group in the formula given above, has 1 to 6 carbon atoms.

The polyepoxy compounds can be prepared by the method taught in British Specification No. 793,915, Example I. The other classes of compound can be similarly prepared, as in Example 10 in U.S. Pat. No. 3,009,884.

Typical of the acids and their esters to provide the chain-extending difunctional radical are the dialkyl phthalic, isophthalic or terephthalic esters, such as dimethyl terephthalate and adipic, phthalic, terephthalic, sebacic, glutaric, pimelic, isocinchomeronic acids and their esters.

Typical of the polyepoxy compounds which provide the difunctional or divalent compounds, used to chain-extend the tetrols based on diamines, are those polyepoxy compounds described in British Specification No. 793,915 to Union Carbide on page 2, line 48 to line 121.

Also useful to form chain-extending divalent radicals are the aromatic or aliphatic diisocyanates, having a structure OCN-R'-NCO, where R' is defined as above.

The antistatic fiber of this invention may also contain conventional fiber additives such as antioxidants, stabilizers, delusterants, dyeing assists, and colorants.

DESCRIPTION OF THE PREFERRED EMBODIMENTS

The invention will now be further described in the following specific examples which are to be regarded solely as illustrative and not as restricting the scope of the invention. Parts are by weight.

EXAMPLE 1

This example shows a method of preparing a preferred antistatic additive of the type disclosed in U.S. application Ser. No. 294,971, filed Oct. 11, 1972. The instant chain-extended polymer is prepared from a tetrol compound covered by U.S. Pat. No. 2,979,528 to Lundsted, and sold commercially under the trademark Tetronic 1504.

Three hundred grams of Tetronic 1504 (molecular weight 12,500) was placed in a three-neck flask fitted with a thermometer, stirrer, and addition funnel. The Tetronic 1504 was stirred and heated to 105° C., and 4.2 grams of dimethyl terephthalate (molecular weight 194.2) was added to the material in the flask. Agitation was continued for about 3 hours at 200° C. after the addition was completed. Then the product was cooled to room temperature. It was a soft solid having a melt viscosity of about 10,000 centipoises at 100° C., measured with the Brookfield viscometer. The viscosity of the original Tetronic 1504 was 200 centipoises at 100° C.

EXAMPLE 2

A glass reactor equipped with a heater and stirrer was charged with a mixture of 1,520 grams of e-caprolactam and 80 grams of aminocaproic acid. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 1.7 grams of N,N'-hexamethylene bis (3,5-di-tert-butyl-4-hydroxy-hydrocinnamamide) having the structure:

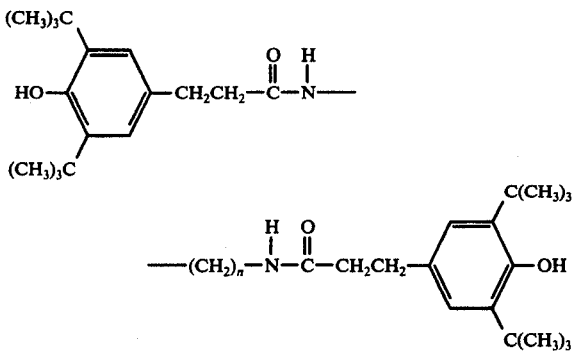

and 48 grams of the antistatic compound of Example 1, were added to the polycaproamide and stirring was continued to thoroughly mix the additives throughout the polymer. Nitrogen was then admitted to the glass reactor and a small pressure was maintained while the polymer was extruded from the glass reactor in the form of a polymer ribbon. The polymer ribbon was subsequently cooled, pelletized, washed and then dried. The polymer was a white solid having a relative viscosity of about 55 to 60 as determined by a concentration of 11 grams of polymer in 100 milliliters of 90 percent formic acid at 25° C. (ASTMD-789-62T).

The polycaproamide pellets containing the antistatic agent and phenol additive were melted at about 285° C. and the melt-extruded under a pressure of about 1,500 p.s.i.g. through a 16-orifice spinnerette, each of the orifices having a diameter of 0.014 inch, to produce a 250-denier fiber. The fiber was then collected at about 1,000 feet per minute and was drawn about 3.5 times its extruded length to produce a 70-denier yarn. For convenience, this yarn hereinafter will be called Yarn A. A control yarn containing the antistatic agent but no additional additive was produced in the same manner as described above. For convenience, this yarn hereinafter will be called Yarn B. A second control yarn containing no antistatic compound and no phenol compound was produced in the same manner as described above; for convenience this yarn hereinafter will be called Yarn C.

Yarn A, Yarn B and Yarn C were woven into conventional plain weave fabrics. The fabrics were cut into fabric test samples having a width of 3 inches and a length of 9 inches. The fabric samples were tested for their antistatic property in accordance with the general procedure described in the Technical Manual of the American Association of Textile Chemists and Colorists, 1969 edition, Volume 45, at pages 206–207. This test procedure is entitled "Electrostatic Clinging of Fabrics: Fabric-to-Metal Test" and is numbered AATCC 115-1969. In accordance with this test, Yarn C showed poor antistatic properties, i.e., the average time for fabric samples to decling from metal completely on their own was over 325 seconds after 5 to 25 wash cycles. In contrast, Yarn A and Yarn B both showed excellent antistatic properties, for example, average time for fabric samples to decling from metal completely on their own was about 130 seconds after 25 wash cycles. Yarn A, Yarn B and Yarn C were also tested for the number of nubs per pound as shown in Example 3.

EXAMPLE 3

This example outlines the method used for locating, identifying and calculating the nubs per pound in Yarn A, Yarn B and Yarn C as prepared in Example 2. In this method a nub is defined as an enlarged place in a filament which is no more than several filament diameters in length. This method may be used for either monofilament or multifilament yarns; however, it is not applicable to most types of crimped yarn.

In accordance with the test, the 70-denier yarn is drawn directly from the package by means of an air aspirator and is passed through an opening of known width, specifically, 0.0030 inch in width. Such as opening is conveniently provided by use of a ceramic cleaner gap, which is well-known in the art. The presence of a nub is detected when it stops the yarn passage through the opening. The filaments are separated and the cause of the yarn stopping identified as a nub or as the twisted end of a broken filament. For representative results, about 75 grams of yarn is passed through the gap and the number of nubs counted. Table I below shows the results of testing on Yarn A, Yarn B and Yarn C.

TABLE I

Determination of Nubs Per Pound

| Yarn Sample | Nub Count Per Pound of Yarn |
|---|---|
| Yarn A | 3,300 |
| Yarn B | 16,700 |
| Yarn C | 2,250 |

It will be noted that polyamide yarn made without additives had a relatively low nub count of 2,250 nubs per pound of yarn. Addition of the antistatic compound to the polyamide caused the nub count to increase to 16,700 per pound of yarn. However, the addition of the antistatic compound plus the phenol compound of the invention reduced the nub count to 3,300 nubs per pound of yarn.

EXAMPLE 4

The procedure of Example 2 (Yarn A) was followed except that the various additives were charged with the caprolactam initially. The antistatic fiber nub count was only 3,200 per pound of yarn.

EXAMPLE 5

The procedure of Example 2 (Yarn A) was followed except that the antistatic additive was charged with the caprolactam but no phenol compound was added. The antistatic fiber had a high nub count of 17,220 nubs per pound of yarn.

EXAMPLE 6

The procedure of Example 2 (Yarn A) was followed except that the antistatic additive was prepared as follows.

Three hundred grams of Tetronic 1504 (molecular weight 12,500) was placed in a three-neck flask fitted with a thermometer, stirrer, and addition funnel. The Tetronic 1504 was stirred and heated to 100° C., and 5.24 grams of 4,4' methylene bis (cyclohexyl) isocyanate,

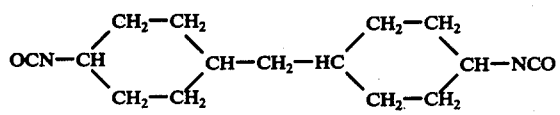

(molecular weight 262.4) was added dropwise to the material in the flask. Agitation was continued for 1 hour at 100°-105° C. after the addition was completed. Then the product was cooled to room temperature. It was a soft solid having a melt viscosity of 8,300 centipoises at 100° C. measured with the Brookfield viscometer. The viscosity of the original Tetronic 1504 was 200 centipoises at 100° C.

Sixty grams of this antistatic compound was added to the polycaproamide together with 1.1 grams of N,N'-hexamethylene-bis-(3,5-di-tert-butyl-4-hydroxy-hydrocinnamamide) and 6.4 grams of 50% aqueous TiO$_2$ dispersion. The fiber nub count was 3,350 per pound of yarn.

EXAMPLE 7

The procedure of Example 2 (Yarn A) was followed except that 90 grams of the antistatic additive of Example 6 was used together with 1 gram of N,N'-hexamethylene-bis-(3,5-di-tert-butyl-4-hydroxy-hydrocinnamamide). The fiber produced had a nub count of 3,200 nubs per pound of yarn.

EXAMPLE 8

Polymer pellets were prepared in accordance with Example 2 which contained 90 grams antistatic agent of Example 1 together with 2.7 grams of N,N'-hexamethylene-bis-(3,5-di-tert-butyl-4-hydroxy-hydrocinnamamide), melted at about 285° C. and then melt extruded under pressure of 1,500 p.s.i.g. to a 70-orifice spinnerette, each of the orifices having a diameter of 0.018 inch to produce a fiber having about 4,500 denier. The fiber was collected at about 1,000 feet per minute and was drawn at about 4 times the extruded length to produce yarn having a denier of about 1125. This yarn will hereinafter be called Yarn D. A control yarn containing no antistatic agent or phenol additive was prepared in the same manner as described above. This yarn will hereinafter be called Yarn E.

The yarns were textured using a steam jet and then two-plied by twisting two ends together with a 1½ "S" twist. The yarns were tufted into a level loop 20 oz. carpet at about 6.5 stitch rate, about 9/32 to 10/32 inch pile height, dyed and latexed. Static buildup of the carpet was tested by measuring the electrostatic voltage buildup on a person walking with a series of steps on a piece of carpet according to the standard CRI Walk Test for static propensity in carpets, also labeled AATCC 134–1969. Carpet was conditioned at 70° F. at 20 percent relative humidity. Results are shown in the following Table.

| Carpet | Static Walk Test |
|---|---|
| Made with Yarn D | 5 KV |
| Made with Yarn E | 14 KV |

The untextured yarn was also tested for nubs using the nub count procedure of Example 3 except that the ceramic cleaner gap used and an opening of 0.006 inch. The nub count of Yarn D was 108 nubs per pound while that of yarn E was 250 nubs per pound.

EXAMPLE 9

Ninety-four parts of polyhexamethylene adipamide and six parts of the antistatic material of structure of Example 1 and 0.18 parts of N,N'-hexamethylene-bis-(3,5-di-tert-butyl-4-hydroxy-hydrocinnamamide) are melt blended by mixing the additive with the molten polyamide at about 285° C. The melt is extruded from a spinneret and the fibers are drawn as described in Example 8. Carpet samples prepared from this fiber and tested in accordance with Example 8 showed a static build-up of 5 KV.

EXAMPLE 10 (Comparative)

In comparative tests with antistatic yarns containing various commercially available hindered phenol compounds, the yarns of the present invention showed significantly greater breaking strength retention after exposure to light in conventional tests.

The antistatic additive used may be purchased commercially or prepared as follows: Three hundred grams of Tetronic 1504 (molecular weight 12,500) was placed in a three-neck flask fitted with a thermometer, stirrer, and addition funnel. The Tetronic 1504 was stirred and heated to 105° C., and 4.2 grams of dimethyl terephthalate (molecular weight 194.2) was added to the material in the flask. Agitation was continued for about 3 hours at 200° C. after the addition was completed. Then the product was cooled to room temperature. It was a soft solid having a melt viscosity of about 10,000 centipoises at 100° C., measured with the Brookfield viscometer. The viscosity of the original Tetronic 1504 was 200 centipoises at 100° C.

The yarns were tested in accordance with the following procedure: The yarns were wound onto 2.75 × 6.5 inch metal plates in single layers and exposed to Xenon-Arc Lamp for 200 hours; the test apparatus was operated in accordance with AATCC test method 16E-1791-Colorfastness to Light: Water-Cooled Xenon-Arc Lamp, Continuous Light. Breaking strength of single filaments (in pounds) was determined before and after exposure to the light, using an Instron Constant Rate of Elongation Tensile Tester and an average was obtained for 10 replications. The standard deviation ($\sigma$) was about 0.5 pound. The percent breaking strength retained (% B.S. Ret.) was calculated as follows:

$$\% \text{ B.S. Ret.} = \frac{\text{Final Breaking Strength}}{\text{Original Breaking Strength}} \times 100$$

The following comparative results are presented in parts, said parts generally related to the specific phenol compound tested or to the amount of phenol compound used.

PART A

Use of N,N'-hexamethylene-bis-(3,5-di-tert-butyl-4-hydroxy-hydrocinnamamide)

A glass reactor equipped with a heater and stirrer was charged with a mixture of 1,520 grams of e-caprolactam and 80 grams of aminocaproic acid. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 2.7 grams of N,N'-hexamethylene-bis-(3,5-di-tert-butyl-4-hydroxy-hydrocinnamamide) and 90 grams of the above-stated antistatic compound were added to the polycaproamide and stirring was continued to thoroughly mix the additives throughout the polymer. Nitrogen was then admitted to the glass reactor and a small pressure was maintained while the polymer was extruded from the glass reactor in the form of a polymer ribbon. The polymer ribbon was subsequently cooled, pelletized, washed, and then dried. The polymer was a white solid having a relative viscosity of about 55 to 60 as determined by a concentration of 11 grams of polymer in 100 milliliters of 90 percent formic acid at 25° C. (ASTMD-789-62T).

The polycaproamide pellets containing the antistatic agent and the phenol additive were melted at about 285° C. and melt-extruded under a pressure of about 2,500 p.s.i.g. through a 12-orifice spinnerette to produce a 570-denier fiber. The fiber was then collected at about 1,250 feet per minute, drawn about 3.2 times its extruded length, and plied to produce a 2,250-denier yarn having a denier of about 16 per filament. Hereinafter, this yarn will be called Yarn I. When Yarn I was exposed to light in accordance with AATCC test method 16E-1971, the percent breaking strength retained was 66%.

A control yarn containing the N,N'-hexamethylene-bis-(3,5-di-tert-butyl-4-hydroxy-hydrocinnamamide) but no antistatic agent was produced in the same manner as described above. Hereinafter, this yarn will be called Yarn II. When Yarn II was exposed to light in accordance with AATCC test method 16E-1971, the percent breaking strength retained was 82%. The difference between Yarn I and Yarn II is significant at a level greater than 99%.

PART B (Use of Irganox 1010)

The procedure of Part A (Yarn I) was followed except that 2.7 grams of Irganox 1010 was added to the polymer instead of 2.7 grams of N,N'-hexamethylene-bis-(3,5-di-tert-butyl-4-hydroxy-hydrocinnamamide). Irganox 1010 is sold commercially and has the structure:

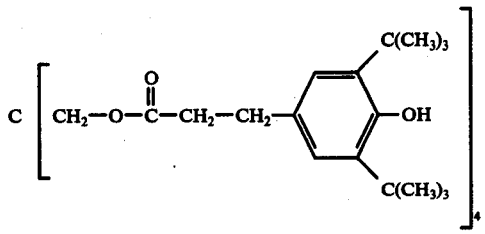

Hereinafter, the resulting yarn will be called Yarn III. When Yarn III was exposed to light in accordance with AATCC test method 16E-1971, the percent breaking strength retained was 16%.

The difference between Yarn I and Yarn III is significant at a level greater than 99%. This shows the criticality of the specific sterically hindered phenol compound used.

PART C (Use of 4,4'-butylidene-bis-(6-tert. butyl m-cresol)

The procedure of Part A (Yarn I) was followed except that 2.7 grams of 4,4'-butylidene-bis-(6-tert-butyl-m-cresol) was added to the polymer together with the 90 grams of the antistatic agent. Hereinafter, the resulting yarn will be called Yarn IV. When Yarn IV was exposed to light in accordance with AATCC test method 16E-1971, the percent breaking strength retained was 61%. The difference between Yarn I and Yarn IV is significant at a level greater than 99%.

PART D (Use of Irganox 1076)

The procedure of Part A (Yarn I) was followed except that 2.7 grams of Irganox 1076 was added to the polymer together with 90 grams of the antistatic agent. Irganox 1076 is sold commercially and has the structure:

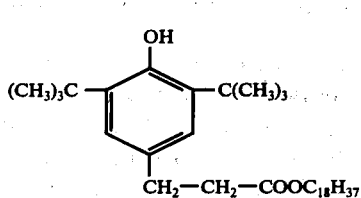

Hereinafter, the resulting yarn will be called Yarn V. When Yarn V was exposed to light in accordance wth AATCC test method 16E-1961, the percent breaking strength retained was 21%. The difference between Yarn I and Yarn V is significant at a level greater than 99%.

PART E (Use of Irganox 565)

The procedure of Part A (Yarn I) was followed except that 2.7 grams of Irganox 565 was added to the polymer together with 90 grams of the antistatic agent. Irganox 565 is sold commercially and has the structure:

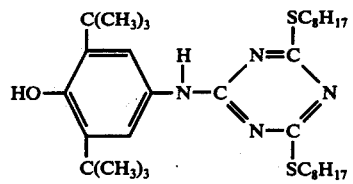

Hereinafter, the resulting yarn will be called Yarn VI. When Yarn VI was exposed to light in accordance with AATCC test method 16E-1971, the percent breaking strength retained was 31%. The difference between Yarn I and Yarn VI is significant at a level greater than 99%.

PART F (Use of Irganox 1010)

The procedure of Part A (Yarn I) was followed except that 3.6 grams of Irganox 1010 was added to the polymer together with 90 grams of the antistatic agent. Irganox 1010 is sold commercially and has the structure:

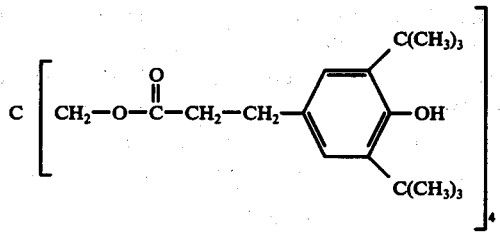

Hereinafter, the resulting yarn will be called Yarn VII. When Yarn VII was exposed to light in accordance with AATCC test method 16E-1971, the percent breaking strength retained was 17%. The difference between Yarn I and Yarn VII is significant at a level greater than 99%.

PART G (No Phenol Compound Used)

The procedure of Part A (Yarn I) was followed except that no phenol compound was added. However, 90 grams of the antistatic compound was added to the polycaproamide as indicated in Part A. Hereinafter, the resulting yarn will be called Yarn VIII. When Yarn VIII was exposed to light in accordance with AATCC test method 16E-1971, the percent breaking strength retained was 30%. The difference between Yarn I and Yarn VIII is significant at a level greater than 99%.

EXAMPLE 11

The following example demonstrates that the N,N'-hexamethylene-bis-(3,5-di-tert-butyl-4-hydroxy-hydrocinnamamide) additive of the present invention is signficiantly less volatile than 4,4'-butylidene-bis-(6-tert-butyl-m-cresol) disclosed in U.S. Pat. No. 3,876,725. Volatility was determined by thermogravimetric analysis using a conventional thermogravimetric analyzer set at a programmed temperature rise of 15° C. per minute under nigrogen atmosphere. The weight loss between 25° C. and 250° C. was determined, as shown in the following table:

| Phenolic Compound | Weight Loss, % |
| --- | --- |
| N,N'-hexamethylene-bis-(3,5-di-tert-butyl-4-hydroxy-hydrocinnamamide) | 0.2 |
| 4,4'-butylidene-bis-(6-tert-butyl-m-cresol) | 23.0 |

It was concluded that in melt spinning of antistatic polyamide, there would be less weight loss of phenolic additive with use of the phenolic compound of the present invention.

DISCUSSION

In additional tests it was determined that the molecular weight of the tetrol compound used to prepare the chain-extended antistatic compound is preferably between about 4,000 and about 50,000, the ethylene oxide moieties making up about 10% to about 90% of the molecular weight of said compound. Preferably, the antistatic fiber contains from about 2% to about 8% of the chain-extended antistatic compound. Normally, the chain-extended antistatic compound has a melt viscosity of 800 to 50,000 centipoises at 100° C.

By "antistatic" fiber is meant fibers that will pass the cling test and the shuffle test as described in U.S. Pat. No. 3,657,386. By "fiber" is meant multifilament yarn, monofilament, and all the known physical forms of synthetic fibers. By "polyamide" is meant the polymers made by condensation of diamines with dibasic acids or by polymerization of lactams or amino acids, resulting in a synthetic resin characterized by the recurring group —CHON—. By "ethylene oxide moiety" is meant the portion of the chemical molecule —($CH_2CH_2O$)—.

We have found that the novel antistatic polyamide fiber of the present invention not only has relatively low nubs per pound of fiber, but in comparative tests with antistatic yarns containing various commercially available hindered phenol compounds, the present fiber showed unusual or unexpected results in that the present fiber showed significantly greater breaking strength retention after exposure to light in standard tests. Moreover, the hindered phenol additive of the present invention is relatively nonvolatile, which tends to reduce losses of the additive during melt spinning of the instant polymer. Further, we have found that the quantity of the instant phenol compound contained in the present antistatic fiber is critical. That is, if the percentage of said phenol compound is too low, the occurrence of nubs in the fiber will not be sufficiently reduced; but if the percentage of said phenol compound is too high, the breaking strength retention of the fiber after exposure to light will be too low. Accordingly, the present invention is restricted to the production of antistatic fiber containing about 0.5 to 12 percent, preferably 1 to 6 percent, based on the weight of the antistatic compound, of the specific phenol compound of the invention.

We claim:

1. An antistatic polyamide fiber having less than 4 × 10³ nubs per pound of fiber, said fiber containing about 1% to 12% by weight of an antistatic compound which is a chain-extended reaction product of a tetrol compound represented by the formula:

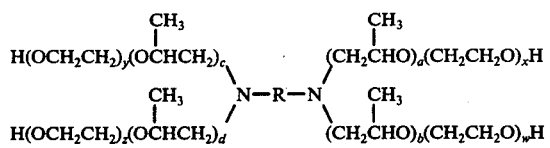

where $a$, $b$, $c$, $d$, $w$, $x$, $y$ and $z$ are each a whole number and R is a difunctional radical from a hydrocarbon containing 1 to 13 carbon atoms, said tetrol compound having a molecular weight between about 4,000 and about 50,000, and at least one compound selected from the group consisting of compounds which yield the divalent radical

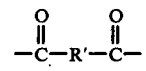

where R' is a difunctional radical from a hydrocarbon containing 1 to 30 carbon atoms; and about 0.5% to 12% by weight, based on the weight of the antistatic compound, of a phenol compound of the formula

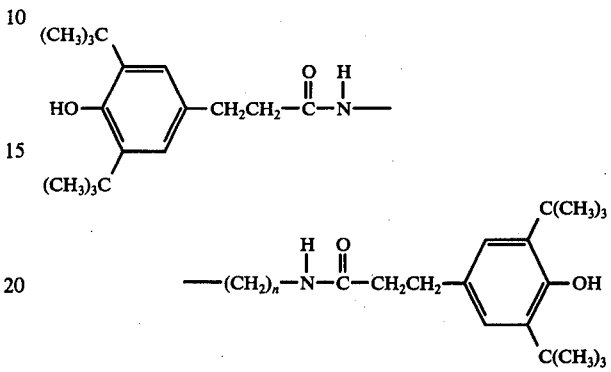

where $n$ is 2 to 6.

2. The fiber of claim 1 wherein the ethylene oxide moieties make up about 10% to about 90% of the molecular weight of the tetrol compound and the chain-extended antistatic compound has a melt viscosity of about 800 to 50,000 centipoises at 100° C.

3. The fiber of claim 2 wherein the phenol compound is N,N'-hexamethylene-bis-(3,5-di-tert-butyl-4-hydroxyhydrocinnamamide).

4. The fiber of claim 1 wherein the fiber contains 1% to 6% by weight, based on the weight of the antistatic compound, of the phenol compound.

5. The fiber of claim 4 wherein the ethylene oxide moieties make up about 10% to 90% of the molecular weight of the tetrol compound and the chain-extended antistatic compound has a melt viscosity of about 800 to 50,000 centipoises at 100° C.

* * * * *